US008055140B2

(12) United States Patent
Vassilieva et al.

(10) Patent No.: US 8,055,140 B2
(45) Date of Patent: Nov. 8, 2011

(54) REDUCING CROSS-PHASE MODULATION USING GROUP DELAY

(75) Inventors: Olga I. Vassilieva, Plano, TX (US); Richard L. Colter, Dallas, TX (US); Daniel Bihon, Plano, TX (US); Paparao Palacharla, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 219 days.

(21) Appl. No.: 12/615,310

(22) Filed: Nov. 10, 2009

(65) Prior Publication Data

US 2011/0109953 A1 May 12, 2011

(51) Int. Cl.
*H04B 10/06* (2006.01)
*H04B 10/12* (2006.01)
*H04J 14/02* (2006.01)

(52) U.S. Cl. .......................... 398/210; 398/81; 398/147

(58) Field of Classification Search .................. 359/259, 359/237, 245, 238, 239; 398/147, 81, 158, 398/159, 161
See application file for complete search history.

(56) References Cited

U.S. PATENT DOCUMENTS

2001/0036002 A1* 11/2001 Tearney et al. ............... 359/287
2006/0193556 A1* 8/2006 Frisken ........................... 385/27

OTHER PUBLICATIONS

Frisken, Steven, "*Advances in Liquid Crystal on Silicon Wavelength Selective Switching*", Optium Australia Pty Ltd., Locomotive Workshop, Australia, OWV4.pdf, © Optical Society of America, 3 pages, 2006.
Kelly, Jack, "*Application of Liquid Crystal Technology to Telecommunication Devices*", NThE1.pdf, © Optical Society of America, 7 pages, 2006.
Wall, Pierre, et al., "*WSS Switching Engine Technologies*", JDSU, © Optical Society of America, 5 pages, 2007.
Wall, Pierre, et al., "*WSS switching engine technologies*", © JDSU, 38 pages, 2008.
Roelens, Michaël A.F., et al., "*Dispersion Trimming in a Reconfigurable Wavelength Selective Switch*", Journal of Lightwave Technology, vol. 26, No. 1, pp. 73-78, Jan. 1, 2008.

* cited by examiner

*Primary Examiner* — Dawayne Pinkney
(74) *Attorney, Agent, or Firm* — Baker Botts L.L.P.

(57) ABSTRACT

According to particular embodiments, reducing cross-phase modulation includes sending instructions to a phase modulation array comprising channel pixel sets that modulate phases of channels. The channel pixel sets comprise a first channel pixel set that modulates a first phase of a first channel and a second channel pixel set that modulates a second phase of a second channel that uses a phase modulation format. The first channel pixel set is instructed to modulate the first phase at a first constant phase. The second channel pixel set is instructed to modulate the second phase at a second constant phase different from the first constant phase in order to create a group delay between the first channel and the second channel.

17 Claims, 5 Drawing Sheets

REDUCING CROSS-PHASE MODULATION USING GROUP DELAY

TECHNICAL FIELD

This invention relates generally to the field of communication systems and more specifically to reducing cross-phase modulation using group delay.

BACKGROUND

Different optical signals may be transported on the same link. In certain situations, cross-phase modulation (XPM) between the signals may occur. Cross-phase modulation is a non-linear optical effect where one wavelength affects the phase of another wavelength. Cross-phase modulation may cause undesirable effects in phase modulated signals.

SUMMARY OF THE DISCLOSURE

In accordance with the present invention, disadvantages and problems associated with previous techniques for reducing cross-phase modulation may be reduced or eliminated.

According to particular embodiments, reducing cross-phase modulation includes sending instructions to a phase modulation array comprising channel pixel sets that modulate phases of the channels. The channel pixel sets comprise a first channel pixel set that modulates a first phase of a first channel and a second channel pixel set that modulates a second phase of a second channel that uses a phase modulation format. The first channel pixel set is instructed to modulate the first phase at a first constant phase. The second channel pixel set is instructed to modulate the second phase at a second constant phase different from the first constant phase in order to create a group delay between the first channel and the second channel.

Certain embodiments of the invention may provide one or more technical advantages. A technical advantage of one embodiment may be that a switching device may apply a group delay between channels, which may reduce cross-phase modulation. The group delay may be applied by instructing a phase modulation array of a switching device to modulate channels at constant phases that may be described by a step profile.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5B of the drawings, like numerals being used for like and corresponding parts of the various drawings.

Figure 1:
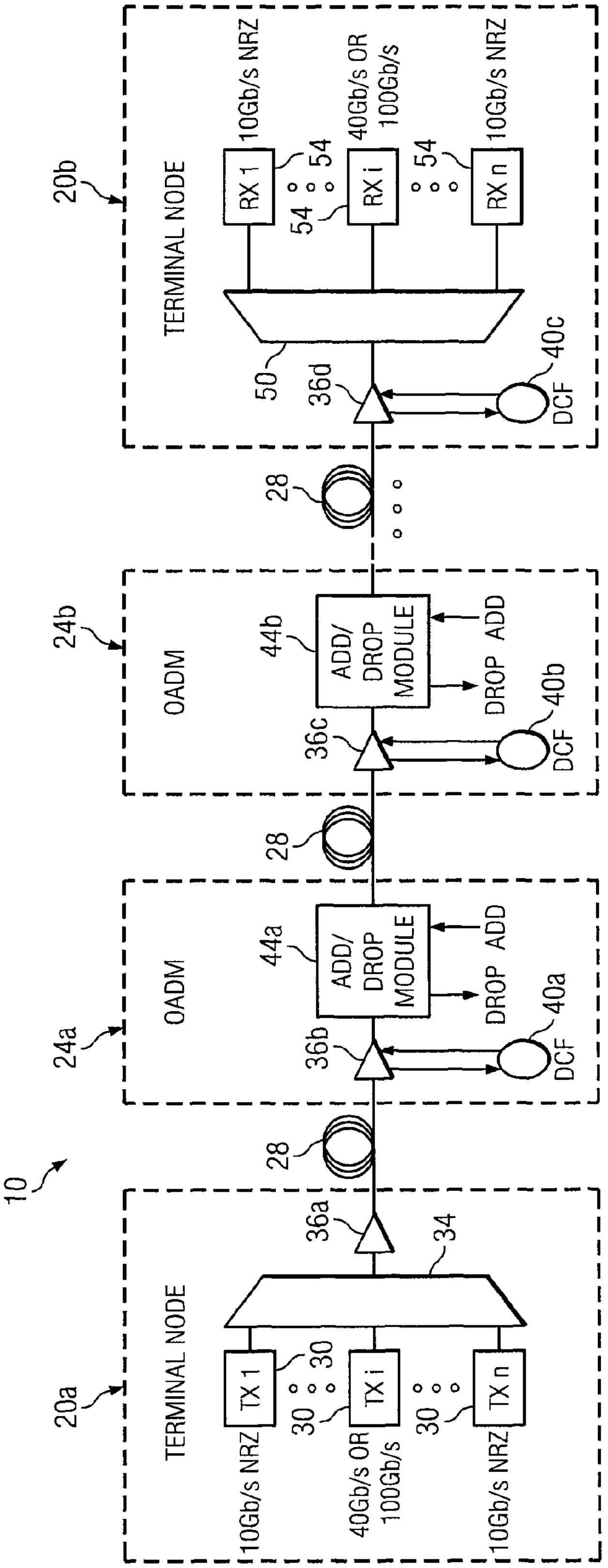
FIG. 1 illustrates an example of a system for which cross-phase modulation may be reduced using group delay.

FIG. 1 illustrates an example of a system 10 for which cross-phase modulation may be reduced using group delay management technique. In particular embodiments, system 10 includes a phased array device that modulates different channels at different constant phases in order to create a group delay between the channels. The modulation may induce an intentional symbol walk-off, which may reduce cross-phase modulation among the channels.

In particular embodiments, system 10 communicates signals, such as optical signals. An optical signal may have a frequency of approximately 1550 nanometers. Signals may be communicated over a channel, which is a communication path having a defined bandwidth such as a specific wavelength range.

A signal may communicate any suitable information, (for example, voice, data, audio, video, multimedia, and/or other information) using any suitable modulation format (for example, an amplitude or phase modulation format) at any suitable data rate (for example, 10, 20, 40, 100, or over 100 gigabits per second (Gb/s)). Examples of amplitude modulation formats include amplitude-shift keying (ASK) and on-off keying (OOK), and examples of phase modulation formats include phase shift keying such as quadrature phase shift keying (QPSK). The information may be communicated in packets communicated using any suitable protocol.

In the illustrated embodiment, system 10 includes terminal nodes 20 (20*a*-20*b*) and optical add-drop multiplexers (OADMs) 24 (24*a*-24*b*) coupled as shown by optical fibers 28.

Terminal nodes 20 send and/or receive signals. In the illustrated embodiment, a transmitting terminal node 20*a* includes transmitters 30, a multiplexer 34, and an amplifier 36*a*. Transmitters 30 (Tx 1, . . . , i, . . . , n) transmit signals to multiplexer 34. Each transmitter 30 transmits signals for a particular channel i, and may modulate the signals using any suitable modulation format. Different transmitters 30 may utilize different data rates and/or different modulation formats on the same link. In the example, Tx 1 uses 10 gigabit per second (Gb/s) non-return-to-zero (NRZ), Tx i uses 40 Gb/s or 100 Gb/s phase modulation, and Tx n uses 10 Gb/s NRZ. Multiplexer 34 multiplexes signals, and amplifier 36 (36*a*, 36*b*, 36*c*) amplifies signals.

In certain situations, signals may create cross-phase modulation that affects phase modulated signals. For example, lower transmission rate signals (such as 10G OOK signals) may introduce phase noise due to a cross-phase modulation effect in higher transmission rate phase modulated signals (such as 40G or 100G phase modulated signals).

A receiving terminal node 20*b* includes an amplifier 36*d*, dispersion compensating fiber 40*c*, a demultiplexer 50, and receivers 54. Demultiplexer 50 demultiplexes the signals. Receivers 54 (Rx 1, . . . , i, . . . , n) receive signals from demultiplexer 50. Each receiver 54 receives signals for a channel i. Fiber 28 may comprise any suitable optical fiber that can communicate optical signals.

An optical add-drop multiplexer 24 (24*a*-24*b*) includes an amplifier 36 (36*b*-36*c*), dispersion compensating fiber 40 (40*a*-40*b*), and an add drop module (44*a*-44*b*). Dispersion compensating fiber 40 (40*a*-40*c*) may reduce dispersion. Add/drop module 44 may switch, add, drop, and/or otherwise manipulate channels.

In certain embodiments, an add/crop module 44 may include a phase modulation array and a controller. The phase modulation array comprises channel pixel sets that each modulate a phase front of a particular channel. The channel pixel sets may comprise one or more first channel pixel sets that modulate one or more first channels, and one or more second channel pixel sets that modulate one or more second channels. At least one first channel may use an amplitude modulation format, and at least one second channel may use a phase modulation format.

The controller (which may be a wavelength selective switch controller) may instruct the first channel pixel sets to modulate the first channels at a first constant phase and the second channel pixel sets to modulate the second channels at a second constant phase different from the first constant phase. The modulation creates a group delay between the first channels and the second channels to induce an intentional symbol walk-off, which may reduce cross-phase modulation.

In particular embodiments, system 10 may comprise a portion of and/or be coupled to a network, such as an optical network. An example of an optical network is a ring network that has a ring topology, such as a resilient packet ring (RPR). A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Figure 2:
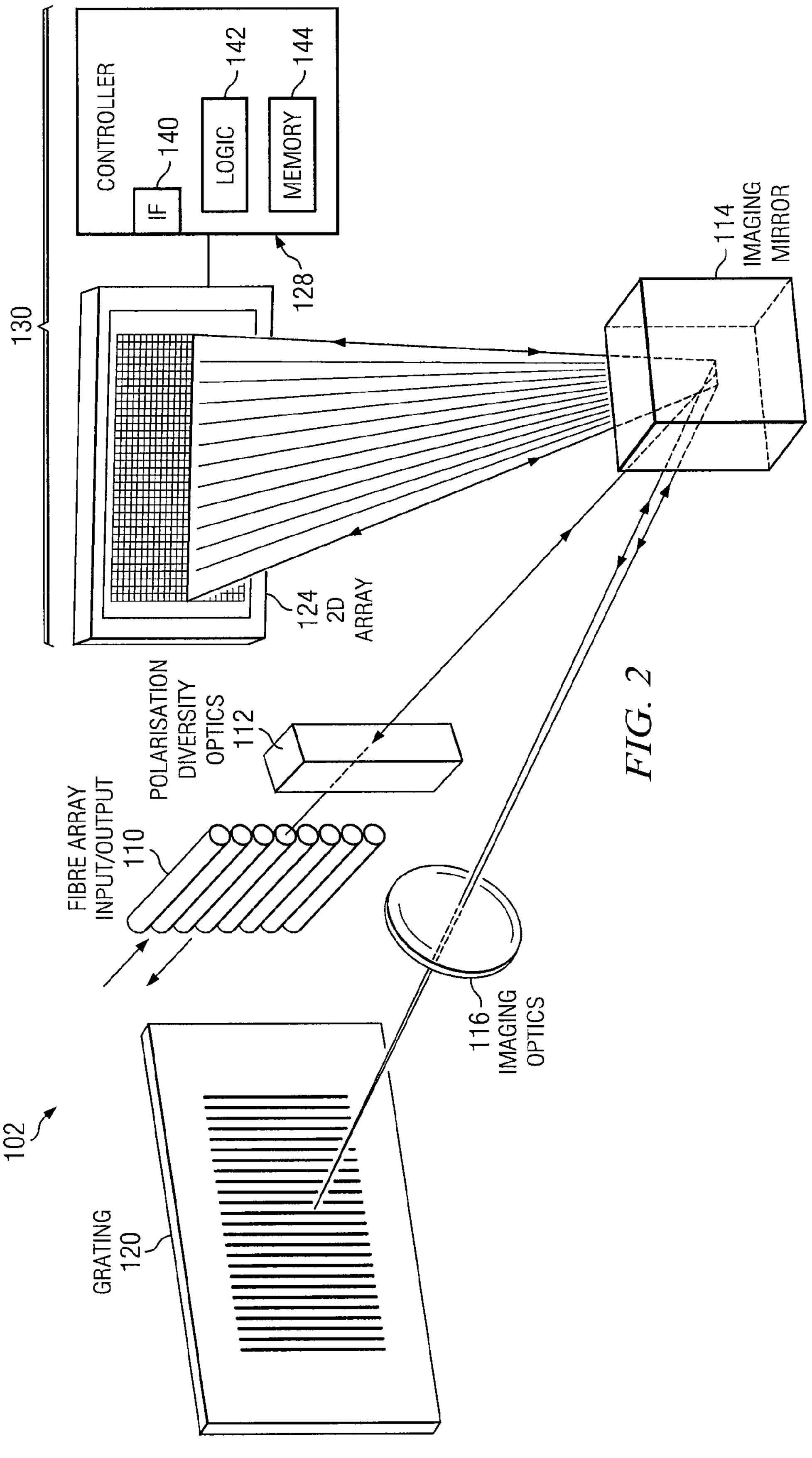
FIG. 2 illustrates an example of a wavelength selective switch that may switch channels at an optical add-drop multiplexer.
Figure 3:
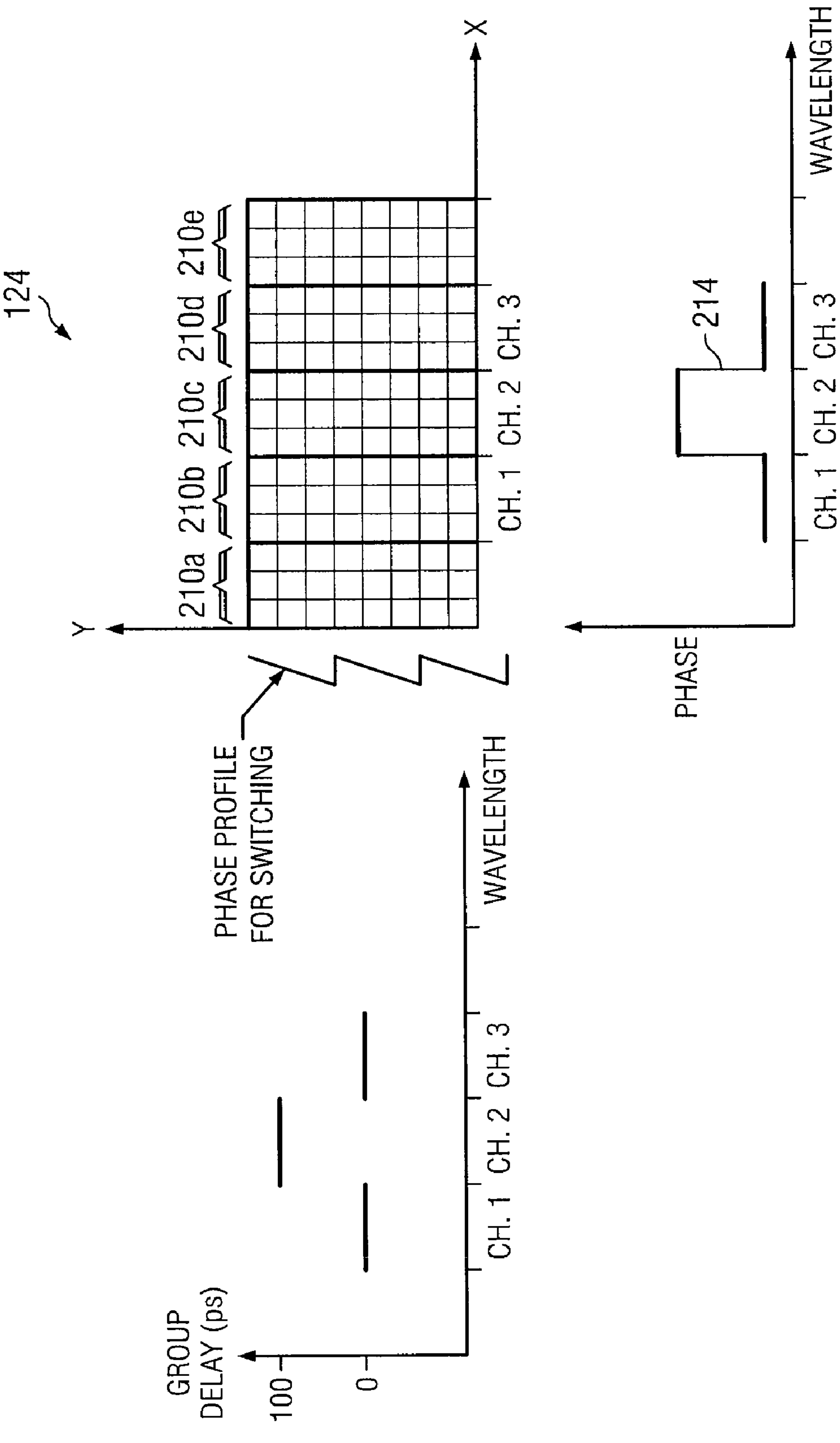
FIG. 3 illustrates an example of a phase modulation array that may be used with the wavelength selective switch of FIG. 2.

FIGS. 2 and 3 illustrate an example of applying a group delay between channels. FIG. 2 illustrates an example of a wavelength selective switch 102 that may switch channels at an add/drop module 44 of an OADM 24*a*, and FIG. 3 illustrates an example of a phase modulation array 124 that may be used with wavelength selective switch 102. In the illustrated embodiment, wavelength selective switch 102 includes a fiber array input/output 110, polarization diversity optics 112, an imaging mirror 114, imaging optics 116, a grating 120, and a modulator 130. Modulator 130 may include a two-dimensional array 124 and a controller 128 (which may be the controller of switch 102).

Wavelength selective switch 102 can physically separate each channel from a WDM signal and apply group delay to specific channels. In certain embodiments, signals enter through fiber array input/output 110. Polarization diversity optics 112 polarize the signals. Imaging mirror 114 directs the signals through imaging optics 116 to grating 120. Grating 120 separates the wavelengths of the signals and directs the signals to imaging mirror 114. Imaging mirror 114 directs the signals to array 124 of modulator 130. Array 124 modulates the signals according to instructions from controller 128.

In certain embodiments, modulator 130 may include a phase modulation array 124 and a controller 128. Phase modulation array 124 may comprise any suitable two-dimensional array that includes pixels configured to modulate the phases of the signals. Examples of arrays include a liquid crystal on silicon (LCOS) array and a lead lanthanum zirconate titanate (PLZT) array. An LCOS array includes liquid crystal and semiconductor Complementary metal-oxide-semiconductor (CMOS). The refractive index of the pixels of an LCOS array may be electronically changed in order to modulate, such as change the phase of, light.

In the example of FIG. 3, phase modulation array 124 comprises channel pixel sets 210 (210 *a-f*). The y-axis of array 124 is used for switching capabilities, and the x-axis is used for implementing group delay. A channel pixel set 210 is configured to modulate a particular channel. In the example, channel pixel set 210*b* modulates channel 1, channel pixel set 210*c* modulates channel 2, and channel pixel set 210*d* modulates channel 3. A channel pixel set 210 may be any suitable size to modulate a particular channel. For example, a channel pixel set 210 may be in the range of 0 to 50 Gigahertz (GHz) along the x-axis, and about 300 to 500 (such as 400) pixels along the y-axis.

Controller 128 instructs phase modulation array 124 to modulate the phases of channels, and includes an interface (IF) 140, logic 142, and a memory 144, which are described below. In certain embodiments, controller 128 instructs channel pixel sets 210 to create a group delay between certain channels, which may reduce cross-phase modulation. In certain embodiments, controller 128 instructs channel pixel sets 210 to modulate channels at constant phases, where the constant phases may be different for different channels. This modulation may yield a phase profile 214 that approximates a step function. In the example, channel pixel set 210*b* modulates channel 1 at first constant phase, channel pixel set 210*c* modulates channel 2 at second constant phase, and channel pixel set 210*d* modulates channel 3 at third constant phase, which may be equivalent to the first constant phase. The resulting group delay may have any suitable value, such as 50 to 200 picoseconds (ps), for example 100 ps.

Controller 128 may instruct phase modulation array 124 to modulate at a constant phase within a channel by instructing array 24 to maintain a constant refractive index for the channel. For example, the voltage may be controlled to yield a constant refractive index across a channel to yield a constant phase across the channel.

The constant phases applied to the channels may be determined in any suitable manner. In certain embodiments, the phases may be determined from a system profile that describes, for a particular signal modulation format, the Q-penalty with respect to the delay time. An example of a system profile is described in more detail with reference to FIG. 4.

Figure 4:
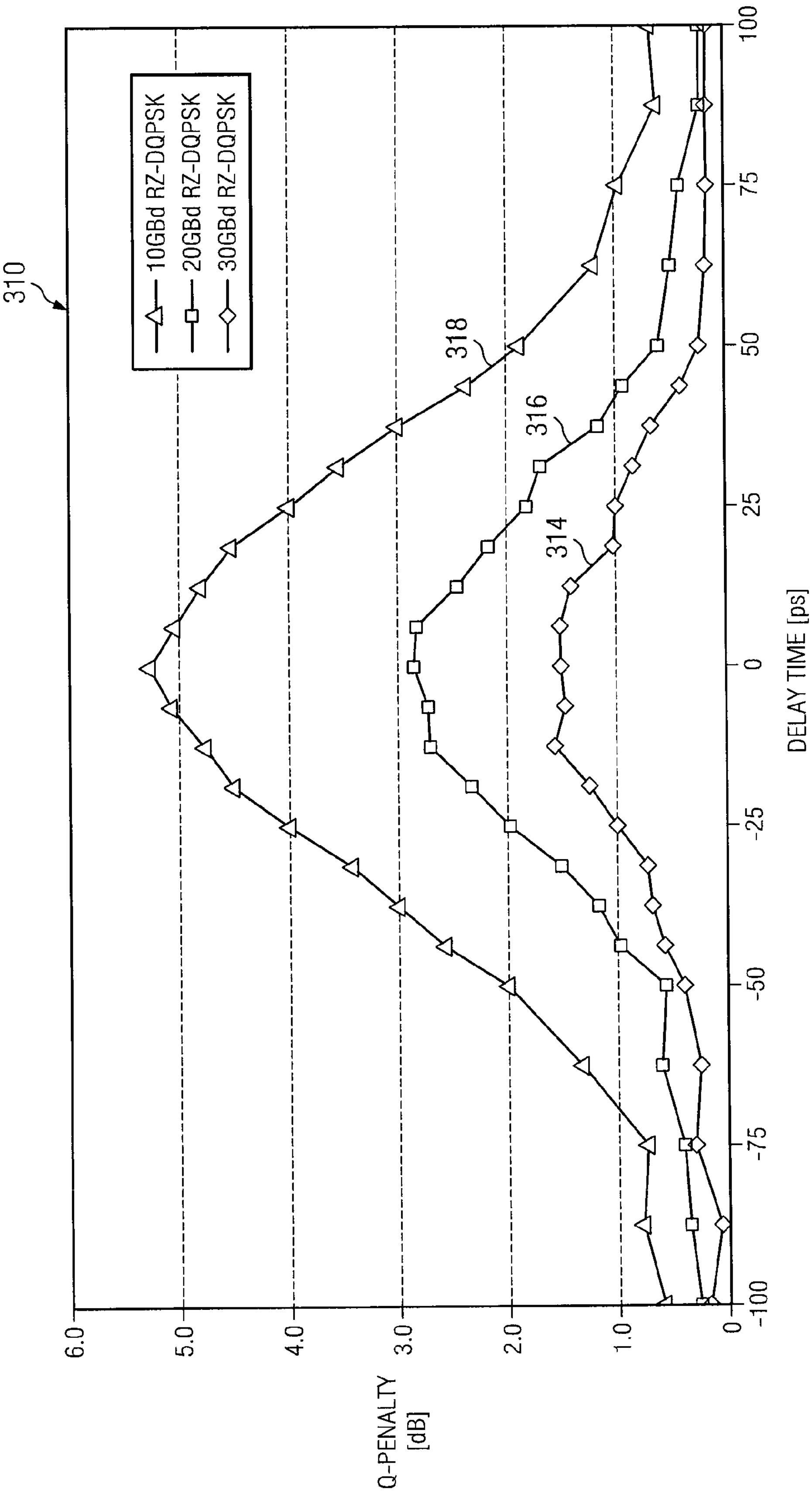
FIG. 4 illustrates an example of a system profile that may be used to determine the amount of group delay to apply to a channel.

FIG. 4 illustrates an example of a system profile 310 that may be used to determine the amount of delay to apply to a channel to reduce cross-phase modulation to a level acceptable for a particular application. System profile 310 illustrates examples of curves that describe the Q-penalty of signals with respect to delay time. The Q-penalty (expressed in decibels (dB)) indicates the system penalty due to cross-phase modulation. Delay time (expressed in picoseconds (ps)) indicates the delay time for the specific Q-penalty.

Curve 314 describes a 30 gigabaud (GBd) return-to-zero differential quadrature phase shift keying (RZ-DQPSK) signal. If an acceptable Q-penalty level is approximately 1.0 decibels, curve 314 indicates that a group delay of approximately 25 picoseconds (ps) may be applied to yield a satisfactory Q-penalty. Curve 316 describes a 20 GBd RZ-DQPSK signal and indicates that a group delay of approximately 40 ps may be applied. Curve 318 describes a 10 GBd RZ-DQPSK signal and indicates that a group delay of approximately 75 ps may be applied. Profile 310 also indicates that there may be a significant reduction of cross-phase modulation with a group delay of 100 ps.

The phase difference $\phi$ to apply between channels to yield a group delay $T_g$ between the channels may be determined according to equation (1):

$$T_g = \frac{d\varphi}{dw} \quad (1)$$

where w represents the angular frequency.

Referring back to FIGS. 2 and 3, in particular embodiments, controller 128 may receive a request requesting a signal modulation format for a particular channel. Controller 128 may access a system profile indicating a recommended group delay value between the channel and one or more adjacent channels. A phase difference corresponding to the group delay value may be determined using Equation (1). Controller 128 may then apply constant phases to the channels to yield the phase difference.

Figure 5B:
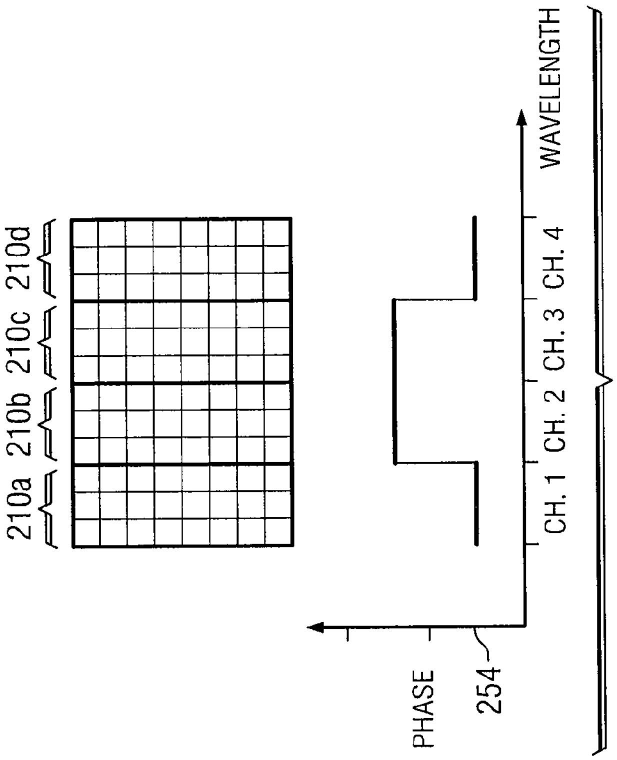
FIGS. 5A and 5B illustrate examples of phase profiles that may describe channels modulated to apply a group delay.
Figure 5A:
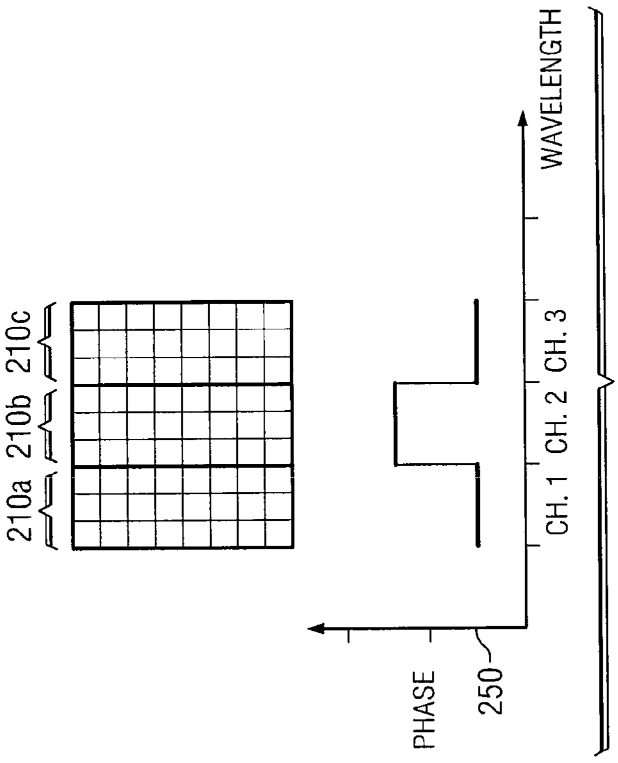

FIGS. 5A and 5B illustrate examples of phase profiles that may describe channels modulated by modulator 130. The modulation may yield any suitable profile, which may be selected according to the signal modulation formats of the channels.

In FIG. 5A, channels 1 and 3 may utilize a similar signal modulation format. In the example, channel pixel set 210*a* modulates channel 1 at first constant phase, channel pixel set 210*b* modulates channel 2 at second constant phase, and channel pixel set 210*c* modulates channel 3 at third constant phase, which may be equivalent to the first constant phase.

In FIG. 5B, channels 1 and 4 may utilize a first signal modulation format, and channels 2 and 3 may utilize a second signal modulation format different from the first signal modulation format. In the example, channel pixel set 210*a* modulates channel 1 at first constant phase, contiguous channel pixel sets 210*b* and 210*c* modulate channels 2 and 3 at the same second constant phase, and channel pixel set 210*d* modulates channel 4 at third constant phase, which may be equivalent to the first constant phase.

The systems and apparatuses disclosed herein (for example, controller 128) may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of controller 128 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus comprising:

an interface configured to:

send one or more instructions to a phase modulation array, the phase modulation array comprising a plurality of channel pixel sets, each channel pixel set configured to modulate a phase of a channel of a plurality of channels, the plurality of channel pixel sets comprising one or more first channel pixel sets that modulate one or more first phases of one or more first channels and one or more second channel pixel sets that modulate one or more second phases of one or more second channels, at least one second channel using a phase modulation format; and one or more tangible computer-readable storage media storing logic configured to:

instruct the one or more first channel pixel sets to modulate the one or more first phases at a first constant phase; and instruct the one or more second channel pixel sets to modulate the one or more second phases at a second constant phase to create a group delay between the first channels and the second channels, the second constant phase different from the first constant phase the logic further configured to: receive a request for a signal modulation format for a second channel; access a system profile indicating a group delay value for the second channel; and determine the second constant phase according to the group delay value.

2. The apparatus of claim 1, at least one first channel using an amplitude modulation format.

3. The apparatus of claim 1, the first constant phase equivalent to a zero constant phase.

4. The apparatus of claim 1, the phase modulation array comprising an array selected from the following:

a liquid crystal on silicon array; or a lead lanthanum zirconate titanate (PLZT) array.

5. The apparatus of claim 1, the modulation yielding a phase profile approximating a step function.

6. The apparatus of claim 1, at least two second channel pixel sets contiguous to each other.

7. The apparatus of claim 1, a first channel pixel set disposed between two second channel pixel sets.

8. A method comprising:

interfacing with a phase modulation array, the phase modulation array comprising a plurality of channel pixel sets, each channel pixel set configured to modulate a phase of a channel of a plurality of channels, the plurality of channel pixel sets comprising one or more first channel pixel sets that modulate one or more first phases of one or more first channels and one or more second channel pixel sets that modulate one or more second phases of one or more second channels, at least one second channel using a phase modulation format;

instructing the one or more first channel pixel sets to modulate the one or more first phases at a first constant phase; and instructing the one or more second channel pixel sets to modulate the one or more second phases at a second constant phase to create a group delay between the first channels and the second channels, the second constant phase different from the first constant phase receiving a request for a signal modulation format for a second channel; accessing a system profile indicating a group delay value for the second channel; and determining the second constant phase according to the group delay value.

9. The method of claim 8, at least one first channel using an amplitude modulation format.

10. The method of claim 8, the first constant phase equivalent to a zero constant phase.

11. The method of claim 8, the phase modulation array comprising an array selected from the following:

a liquid crystal on silicon array; or a lead lanthanum zirconate titanate (PLZT) array.

12. The method of claim 8, the modulation yielding a phase profile approximating a step function.

13. The method of claim 8, at least two second channel pixel sets contiguous to each other.

14. The method of claim 8, a first channel pixel set disposed between two second channel pixel sets.

15. One or more non-transitory computer-readable media having computer-executable instructions when executed by a computer operable to:

communicate with a phase modulation array, the phase modulation array comprising a plurality of channel pixel sets, each channel pixel set configured to modulate a channel of a plurality of channels, the plurality of channel pixel sets comprising one or more first channel pixel sets that modulate one or more first phases of one or more first channels and one or more second channel pixel sets that modulate one or more second phases of one or more second channels, at least one second channel using a phase modulation format;

instruct the one or more first channel pixel sets to modulate the one or more first phases at a first constant phase; and instruct the one or more second channel pixel sets to modulate the one or more second phases at a second constant phase to create a group delay between the first channels and the second channels, the second constant phase different from the first constant phase the instructions further configured to: receive a request for a signal modulation format for a second channel; access a system profile indicating a group delay value for the second channel; and determine the second constant phase according to the group delay value.

16. The computer-readable media of claim 15, at least one first channel using an amplitude modulation format.

17. The computer-readable media of claim 15, the modulation yielding a phase profile approximating a step function.

* * * * *